(12) United States Patent
Hansen

(10) Patent No.: US 12,072,148 B2
(45) Date of Patent: Aug. 27, 2024

(54) SENSOR POSITIONING DEVICE FOR USE ON A VIAL IN A LYOPHILISATION PROCESS, A SENSOR UNIT, AND A METHOD OF MOUNTING A SENSOR IN A STOPPER FOR A VIAL

(71) Applicant: Ellab A/S, Hillerød (DK)

(72) Inventor: Rasmus Hansen, Hillerød (DK)

(73) Assignee: Ellab A/S, Hillerød (DK)

( * ) Notice: Subject to any disclaimer, the term of this patent is extended or adjusted under 35 U.S.C. 154(b) by 656 days.

(21) Appl. No.: 17/309,969

(22) PCT Filed: Nov. 23, 2020

(86) PCT No.: PCT/DK2020/050323
§ 371 (c)(1),
(2) Date: Jul. 6, 2021

(87) PCT Pub. No.: WO2021/249598
PCT Pub. Date: Dec. 16, 2021

(65) Prior Publication Data
US 2022/0307766 A1    Sep. 29, 2022

(30) Foreign Application Priority Data
Jun. 10, 2020 (WO) ................ PCT/DK2020/050166

(51) Int. Cl.
*F26B 5/06*     (2006.01)
*G01D 11/30*    (2006.01)

(52) U.S. Cl.
CPC ............... *F26B 5/06* (2013.01); *G01D 11/30* (2013.01)

(58) Field of Classification Search
CPC ................................. F26B 5/06; G01D 11/30
(Continued)

(56) References Cited

U.S. PATENT DOCUMENTS 3,795,986 A * 3/1974 Sutherland ................ F26B 5/06
34/92
4,609,102 A * 9/1986 Blum ........................ F26B 5/06
426/402

(Continued)

FOREIGN PATENT DOCUMENTS

EP          3948128 B1 * 12/2023 ................ F26B 5/06
WO    WO-2021249597 A1 * 12/2021
WO    WO-2021249598 A1 * 12/2021 ................ F26B 5/06

OTHER PUBLICATIONS

International Search Report and Written Opinion, dated Feb. 19, 2021, 4 pages, issued in PCT Application No. PCT/DK2020/050323.

*Primary Examiner* — Stephen M Gravini
(74) *Attorney, Agent, or Firm* — AVEK IP, LLC

(57) ABSTRACT

The invention relates to a sensor positioning device for use on a vial in a lyophilisation process, a sensor unit including such a device, and a method of mounting a sensor in a stopper for a vial. The sensor positioning device comprises a stopper for closing an opening in a neck of the vial. A cable passage is provided in the stopper and has a first passage section extending through a first part of the stopper. A second passage section is provided between the first passage section and an outer rim and a sub-section thereof extends away from an exterior surface and is located at a distance from the first passage section in a direction parallel to the exterior surface. In the sensor unit at least two bends are provided on the cable. The invention also relates to a sensor positioning device comprising a stopper, a spacer and a connector.

20 Claims, 5 Drawing Sheets

(58) Field of Classification Search
USPC .............................................................. 34/89
See application file for complete search history.

(56) References Cited

U.S. PATENT DOCUMENTS

| | | | |
|---|---|---|---|
| 4,966,469 | A | 10/1990 | Fraser et al. |
| 5,447,374 | A | 9/1995 | Fraser et al. |
| 5,522,155 | A * | 6/1996 | Jones ...................... A61J 1/065 |
| | | | 34/286 |
| 5,689,895 | A | 11/1997 | Sutherland et al. |
| 5,791,466 | A * | 8/1998 | Tsals ..................... A61J 1/2089 |
| | | | 604/82 |
| 5,958,778 | A * | 9/1999 | Kidd ......................... F26B 5/06 |
| | | | 436/178 |
| 8,171,652 | B2 * | 5/2012 | Py ............................. F26B 5/06 |
| | | | 34/287 |
| 9,222,728 | B2 * | 12/2015 | Py ............................. F26B 5/06 |
| 11,325,152 | B2 * | 5/2022 | Baltazar .................. C23C 16/30 |
| 2006/0239331 | A1 * | 10/2006 | Schwegman .......... G01K 1/024 |
| | | | 374/E1.004 |
| 2008/0244923 | A1 * | 10/2008 | Yarborough ............ A61M 5/31 |
| | | | 34/287 |
| 2022/0307766 | A1 * | 9/2022 | Hansen .................. G01D 11/30 |
| 2023/0263957 | A1 * | 8/2023 | Taha ..................... C23C 16/505 |
| | | | 604/411 |

* cited by examiner

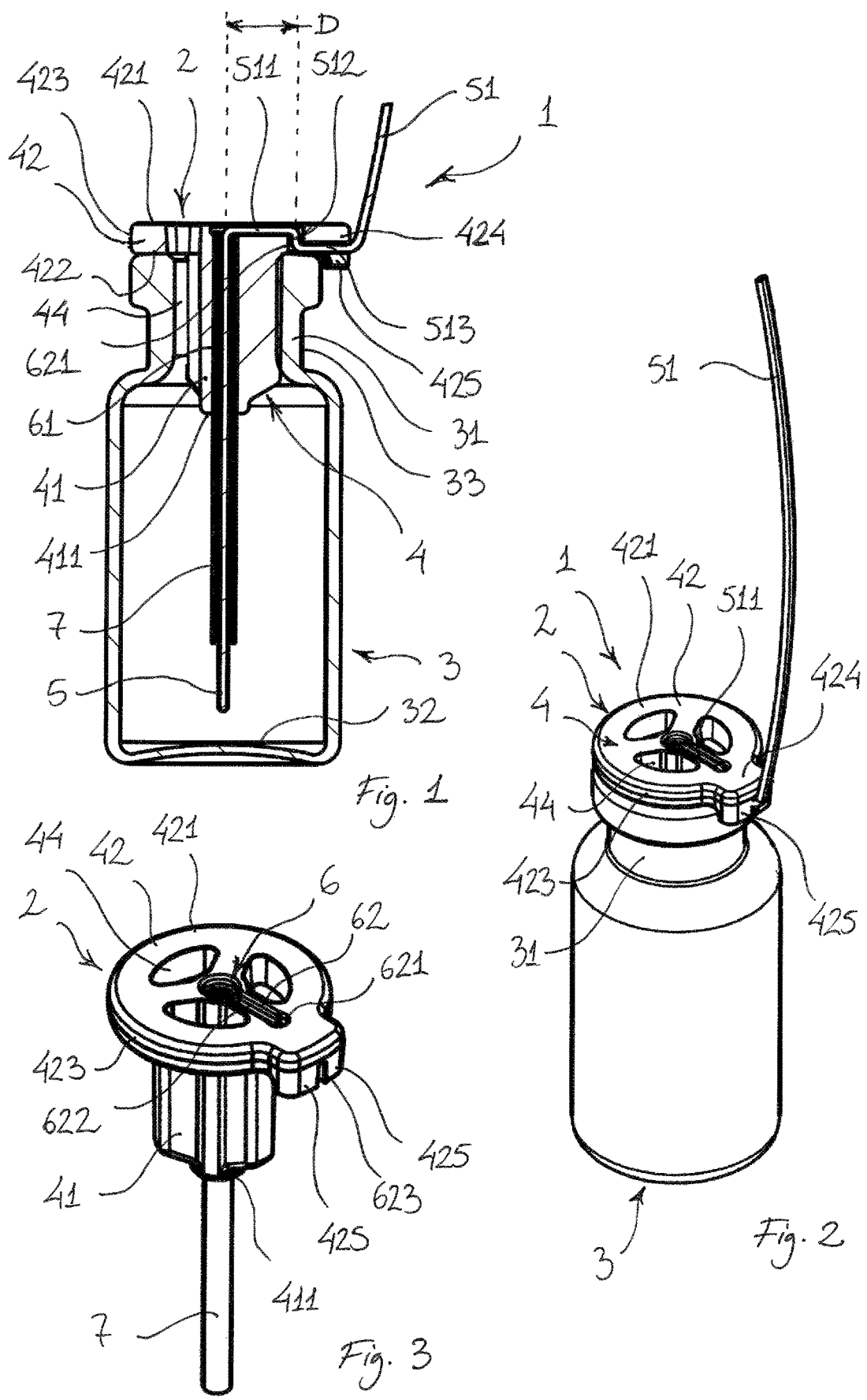

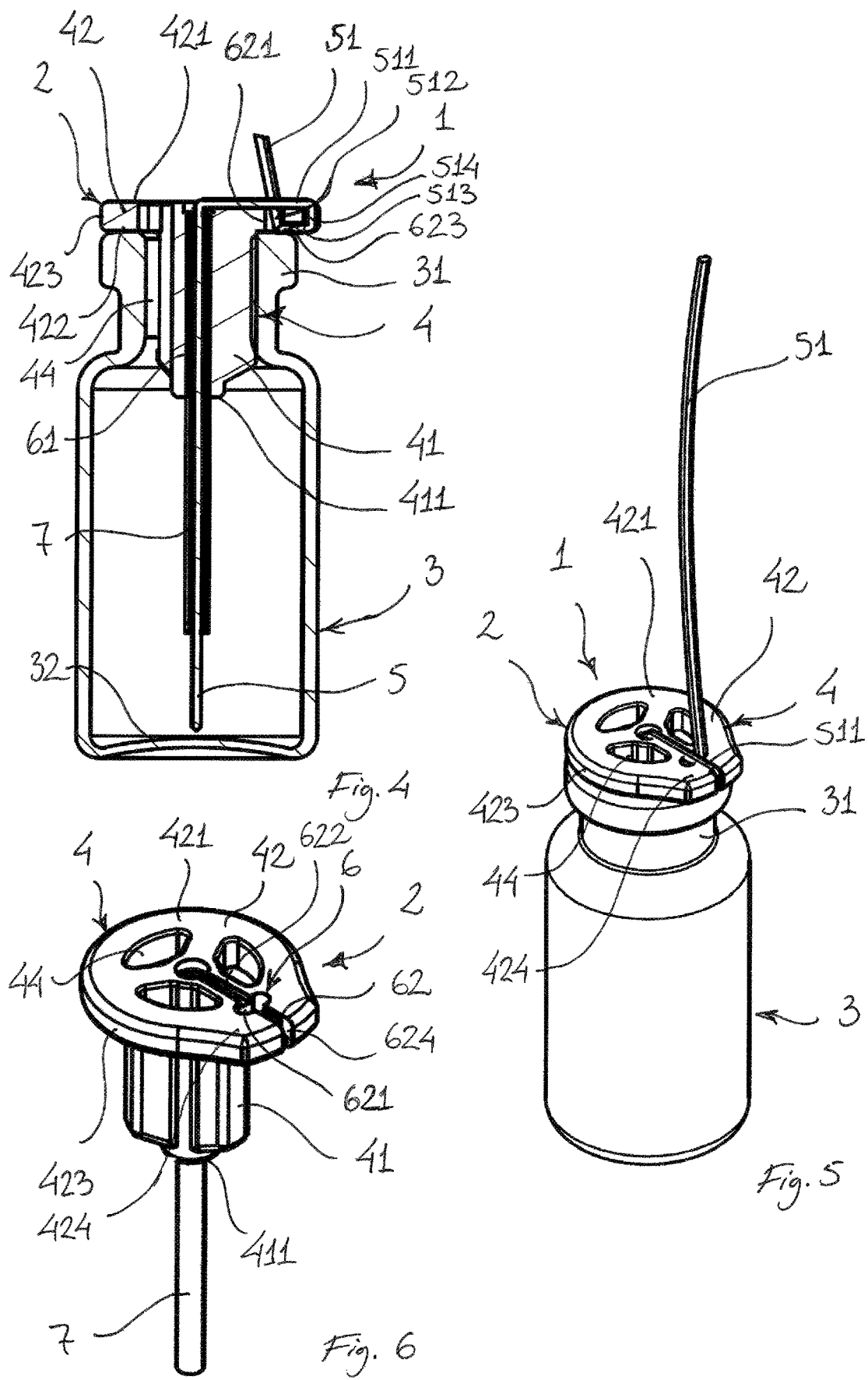

SENSOR POSITIONING DEVICE FOR USE ON A VIAL IN A LYOPHILISATION PROCESS, A SENSOR UNIT, AND A METHOD OF MOUNTING A SENSOR IN A STOPPER FOR A VIAL

CROSS-REFERENCE TO RELATED APPLICATIONS

This application is the U.S. national phase of, and claims priority to, International Application No. PCT/DK2020/050323, filed 23 Nov. 2020, which designated the U.S. and which claims priority to International Application No. PCT/DK2020/050166, filed 10 Jun. 2020.

SUMMARY

The following presents a simplified summary of the invention in order to provide a basic understanding of some aspects of the invention. This summary is not an extensive overview of the invention. It is not intended to identify critical elements of the invention or to delineate the scope of the invention. Its sole purpose is to present some concepts of the invention in a simplified form as a prelude to the more detailed description that is presented elsewhere herein.

The invention relates to a sensor positioning device for use on a vial in a lyophilisation process comprising a stopper configured for closing a neck opening of the vial when mounted thereon, said stopper comprising: a first part configured for extending into the vial and a second part configured for extending over the neck opening of the vial, said first part extending away from the second part and having a distal end opposite the second part, and said second part forming an exterior surface of the stopper and having an outer rim delimiting the stopper in a plane extending in parallel with the exterior surface; a cable passage having a first passage section extending from the distal end towards the exterior surface and allowing a cable of a sensor to pass through the first part of the stopper and a second passage section between the first passage section and the outer rim; and at least one vapour opening allowing vapour to escape from the vial. The invention further relates to a sensor unit and to a method of mounting a sensor in a stopper for a vial thereby creating a sensor unit.

BRIEF DESCRIPTION OF THE DRAWINGS

In the following the invention will be described in more detail with reference to embodiments shown in the drawings, where:

FIG. 1 is a cross-sectional view of a sensor unit mounted on a vial,

FIG. 2 is a perspective view of the sensor unit and vial in FIG. 1,

FIG. 3 is a perspective view of the stopper used in the sensor unit in FIGS. 1 and 2, FIG. 4 is a cross-sectional view of another sensor unit mounted on a vial, FIG. 5 is a perspective view of the sensor unit and vial in FIG. 4, FIG. 6 is a perspective view of the stopper used in the sensor unit in FIGS. 4 and 5.

DETAILED DESCRIPTION

Figure 7:
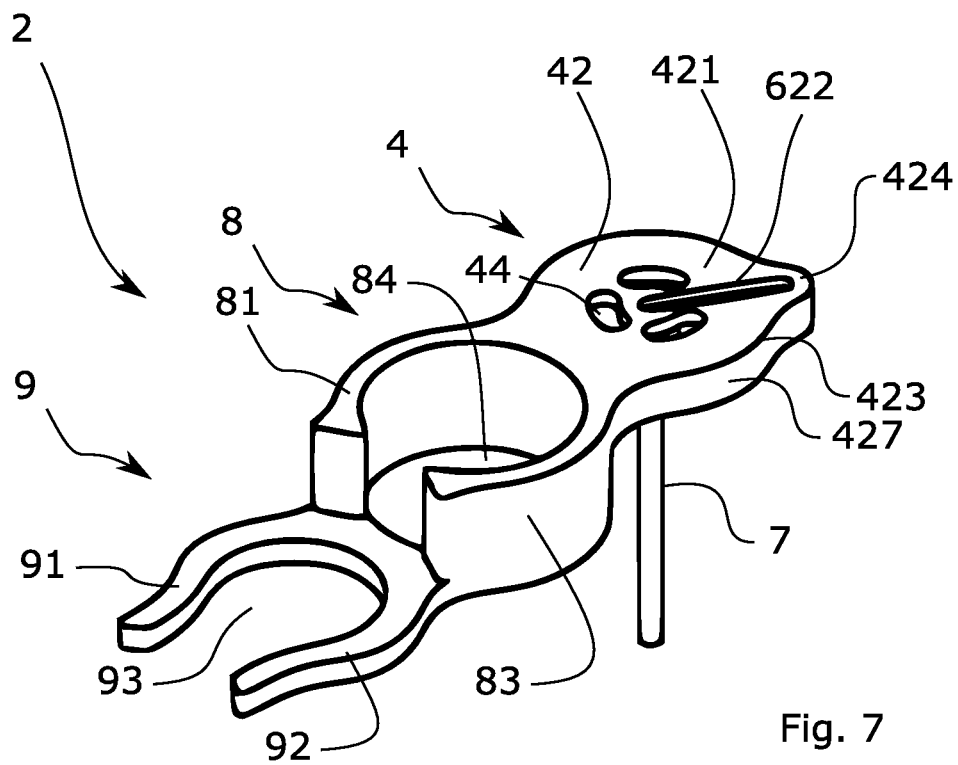
FIG. 7 is a perspective top view of a sensor positioning device according to another embodiment of the invention.

A reliable monitoring and validation of lyophilisation processes is crucial for example within the pharmaceutical industry, where products must be of high and uniform quality. For this purpose, it is important that the sensors used are positioned correctly within the vials during the entire measuring period, and sensor positioning devices have been designed to ensure that this is the case.

One sensor positioning device of the type mentioned above, which has found widespread use, is described in U.S. Pat. No. 5,689,895. This positioning device relies on a cable probe being arranged in a tube extending from the stopper into the cavity of the vial and being fixated in relation to the stopper and/or the vial. The fixation may be achieved either by clamping the cable in the second passage section, which is an open groove extending away from the first passage section towards the outer rim, or by applying an elastic O-ring around the neck of the vial so that the cable is clamped between the vial and the O-ring. In practice, clamping the cable in the cable passage has proven to provide an insufficient protection against pull on the cable, and the O-ring is therefore considered necessary to achieve a reliable positioning. The mounting of the O-ring may, however, be difficult since it usually has to be done in a sterile environment where the operator is required to wear thick gloves. It therefore happens that the probe is pulled out of position during the mounting of the O-ring or that the O-ring is not used.

Another positioning device, which does not require the use of an O-ring, is described in U.S. Pat. No. 5,447,374. This positioning device instead relies on a clamping device on the first part of the stopper, and there is some concern that the presence of the clamping device within the cavity of the vial may add thermal mass, which may influence on the readings from the sensor.

It is therefore an object of the invention to provide a sensor positioning device, which reduces the risk of displacement of the sensor with a low risk of influencing on the readings of the sensor.

This object is achieved with a sensor positioning device of the type described above, where the second passage section or a first sub-section thereof extends away from the exterior surface towards the interior surface and is located at a distance from the first passage section in a direction parallel to the exterior surface. This orientation and position of at least a sub-section the second passage section means that when the cable is passed through the cable passage in a tight manner, at least one bent is formed on the cable in addition to the bent occurring where the cable leaves the first passage section. This bent entails that a pull acting on the part of the cable projecting from the sensor positioning device will result in the part of the cable extending from the first passage section to the second passage section or first sub-section thereof being pulled into a tighter contact with the stopper. In contrast a pull acting at an angle to the length direction of the groove serving as the second passage section in U.S. Pat. No. 5,689,895 would result in the cable being pulled out of the groove. In combination with the bent found where the first and second passage sections meet, the bent resulting from the orientation and position of at least a sub-section of the second passage section according to the invention thus serves as a pull relief preventing a displacement of the sensor. Notably, this is achieved using very simple means affecting neither the space available in the vial nor the thermal mass of the sensor positioning device.

In the following, reference will be made primarily to the use of probes, which are essentially cables in themselves, as sensors. It is, however, to be understood that it is also possible to use other types of sensors to which a cable is connected, and where the cable is passed through the cable passage, while the sensor itself does not extend into the second passage section.

To maximize the effect, the second passage section or the first subsection thereof may extend in a direction, which is substantially perpendicular to the exterior surface. Any angle of more than 45 degrees between the exterior surface and the second passage section or the first sub-section thereof will, however, provide some relief.

The elasticity and frictional characteristics of the material used for the stopper will be important factors with respect to determining the pull relief capacity. At present silicone, ethylene propylene diene monomer (EDPM), and other synthetic rubbers are considered advantageous as they will allow the entire stopper to be made from one material. It is, however, within the scope of the invention to make the first and second parts of the stopper from different materials and/or to coat the cable passage wholly or partially with a material providing desired frictional characteristics. It is noted that the friction between the cable passage and the cable will of course also depend on the surface characteristics of the cable and that the use of different types of probes or cables may therefore potentially require the use of different stoppers.

In embodiments, the second passage section or the first sub-section thereof extends from an opening in the exterior surface to an opening in the interior surface, i.e. all the way through the second part of the stopper. This will facilitate the insertion of the cable into the cable passage, but it is not a requirement. A more closed cable passage may provide a better protection of the cable and it is even within the scope of the invention to first arrange the cable in the desired shape and then mould the stopper around it. Likewise, the second part of the stopper may be made by arranging the cable in or on a base part and then adding a cover layer onto it, for example by moulding or welding or by means of a glue, an adhesive, or even mechanical fastenings means, such as snap-locking.

A second sub-section of the second passage section extending away from the first passage section towards the outer rim may be provided to accommodate the cable section extending away from the first passage section. Likewise, a third sub-section of the second passage section may extend from the first sub-section to the outer rim to accommodate another cable section. These sub-sections of the second passage section may help to guide the cable during assembly of a sensor unit and/or keep the cable in place ones mounted thus potentially contributing to the fixation of the cable in relation to the stopper.

In embodiments the second sub-section of the second passage section is a groove in the exterior side of the second part of the stopper and the third sub-section of the second passage section is a groove in the interior side of the second part of the stopper. In use this allows the cable to be mounted in at least two different ways, where a first cable section extends from the first passage section in a direction towards the outer rim, a second cable section extends through the second passage section or the first sub-section thereof, and at least one further cable section extending along the second part of the stopper, all cable sections being separated from each other by at least one bent.

The first way is to let a first cable section extend in a second subsection of the second passage section from the first passage section to a first sub-section of the second passage section, from there a second cable section extends through the first sub-section of the second passage section, and from there a third cable section extends in a third sub-section from the first subsection of the second passage section to the outer rim. The first, second, and third cable sections are thus arranged in continuation of each other when seen along the length of the cable, and the path followed by the cable has the overall shape of the letter Z.

The second way is to let a first cable section extend in a second subsection of the second passage section from the first passage section to the outer rim, from there a fourth cable section extends from the first cable section across the outer rim to the third cable section, from there the third cable section extends in a third sub-section of the second passage section from the fourth cable section at the outer rim to the first sub-section of the second passage section, and from there the second cable section extends from the third cable section through the first sub-section of the second passage section. When exiting the first sub-section of the second passage section the cable thus passes by the first cable section and the path followed by the cable has the overall shape of the Greek letter α.

Other ways of mounting the cable, including more complex paths than those described above, are of course possible, but it should be ensured that at least two bents are formed on the cable.

The second part of the stopper may comprise a tab configured for projecting over an outer perimeter of the neck of the vial in a mounted state, said tab projecting in a direction parallel to the exterior surface of the stopper and substantially in continuation of the second passage section. Such a tab may facilitate handling of the stopper during mounting of the sensor as the presence of the tab may allow a bigger distance between the first passage section and the second passage section or a first sub-section thereof. This will allow longer cable sections and less bending of the cable during the mounting process. Another advantage of such a tab may be that the additional material provides more space for the second passage section, which may particularly be advantageous when it comprises two or more sub-sections, and in one embodiment a third sub-section of the second passage section extends into the tab.

A tab as described above may also facilitate handling of the assembled sensor unit and the mounting of the sensor unit on the vial.

In embodiments the tab is provided with at least one projection on the interior side, said projection being configured for extending down along an outer side of the neck of the vial in the mounted state of the sensor positioning device. If only a single projection is provided, the second passage section may end on an inner side of the projection so that the cable may be sandwiched between the projection and the outer surface of the neck of the vial, or the second passage section may end in an opening in the projection. Alternatively, two projections may be provided closely side-by-side so that the cable existing from the second passage section may be clamped between them, thus providing an extra hold on the cable where it exits the second passage section.

The sensor positioning device may form part of a sensor unit further comprising a sensor extending from the first part of the stopper and a cable of the sensor. In such a sensor unit a first cable section extends from the first passage section in a direction towards the outer rim and a second cable section extends through the second passage section or the first sub-section thereof, at least one bent being present on the cable between said first and second cable sections, and at least one further cable section, which extends along the second part of the stopper, is separated from the first and second cable sections by at least one bent.

As described with reference to the sensor positioning device above, the cable may then extend in at least two different ways, which will both result in a fixation of the cable without the need for additional elements. One being where the first cable section extends from the first passage section to a first sub-section of the second passage section, where the second cable section extends through the first sub-section of the second passage section, and where a third cable section extends from the first sub-section of the second passage section to the outer rim, said first, second, and third section being arranged in continuation of each other when seen along the length of the cable. Another being where the first cable section extends from the first passage section to the outer rim, where a fourth cable section extends from the first cable section across the outer rim to the third cable section, where the third cable section extends from the fourth cable section at the outer rim to the first sub-section of the second passage section, and where the second cable section extends from the third cable section through the first sub-section of the second passage section.

To facilitate the mounting of the cable, the first cable section may extend along the exterior surface of the second part of the stopper and the third cable section extend along the interior surface of the second part of the stopper.

In a second aspect of the invention the object of the invention is achieved with a method of mounting a sensor including a cable in a stopper for a vial thereby creating a sensor unit for use on a vial in a lyophilisation process, where said stopper is configured for closing an opening in a neck of the vial when mounted thereon, said stopper comprising:
- a first part configured for extending into the vial and a second part configured for extending over the opening of the vial, said first part extending away from the second part and having a distal end opposite the second part, and said second part having an exterior surface forming an exterior surface of the stopper in the mounted state, an interior surface opposite the exterior surface configured for abutting on the neck of the vial, and an outer rim delimiting the stopper in a plane extending in parallel with the exterior surface,
- a cable passage having a first passage section extending from the distal end towards the exterior surface and a second passage section between the first passage section and the outer rim, and
- at least one vapour opening allowing vapour to escape from the vial, said method comprising the following steps:
A) arranging the sensor so that it projects from the distal end of the first part of the stopper, and
B) passing the cable of the sensor through the cable passage, characterized in that step B) comprises the following sub-steps:
arranging a first cable section so that it extends from the first passage section in a direction towards the outer rim,
arranging a second cable section so that it extends through the second passage section or a first sub-section thereof, said second passage section or first sub-section thereof extending away from the exterior surface towards the interior surface and being located at a distance from the first passage section in a direction parallel to the exterior surface,
creating at least one bent on the cable between said first and second cable sections,
arranging at least one further cable section so that it extends along the second part of the stopper, and
creating at least one further bent on the cable between the at least one further cable section and the first and/or second cable sections.

The sub-steps of step B) do not necessarily need to be performed in the order mentioned and it is to be understood that the creation of the bents may include further sub-steps. The insertion of the cable may result in the creation of a soft bent, which is later made sharper by tightening the cable so that it follows the shape of the cable passage and/or surfaces of the stopper.

In a third aspect of the invention the object of the invention is achieved with a sensor positioning device for use on a vial in a lyophilisation process comprising a stopper configured for closing an opening in a neck of the vial when mounted thereon, a spacer, and a connector, said spacer being positioned between the stopper and the connector, wherein the stopper comprises a first part configured for extending into the vial and a second part configured for extending over the opening of the vial, said first part extending away from the second part and having a distal end opposite the second part, and said second part having an exterior surface forming an exterior surface of the stopper in the mounted state, an interior surface opposite the exterior surface configured for abutting on the neck of the vial, and an outer rim delimiting the stopper in a plane extending in parallel with the exterior surface, and at least one vapour opening allowing vapour to escape from the vial, wherein the spacer comprises two spacer members extending from the stopper substantially in parallel to the exterior surface, said spacer members defining a spacer opening for receiving a spacer vial between them, wherein the connector comprises engagement means for attaching the sensor positioning device to a data collector, and wherein the connector extends from the spacer.

Consequently, a sensor positioning device is provided where a data collector is spaced away from the vial from which measurements are collected, and where the data collector and the vial can be kept in their intended relative position.

When a sensor unit including a sensor positioning device is to be used, the sensor positioning device is provided with a sensor and connected to the data collector by the engagement means of the connector. The sensor unit is then moved relative to one or more vials so that the stopper comes into engagement with the neck of a vial with the first part of the stopper projecting into the vial. The sensor unit is preferably arranged so that another vial, herein referred to as a spacer vial, is located in the spacer opening, but it is also possible to leave out the spacer vial and leave the spacer opening empty. The spacer vial or the empty space created by the spacer keeps a distance between the data collector and the vial, within which the sensor is arranged. Thus, the sensor positioning device contributes to reducing the risk of the thermal mass of the data collector influencing the lyophilisation process taking place in the vial, and consequently data collected by the sensor.

In this description the spacer will be described as having a spacer opening matching the shape and size of one vial, but it is within the scope of the invention to use a spacer configured for accommodating two or more vials. In use the data collector with the sensor unit, the vial in which the sensor is positioned, and the spacer vial are usually pushed into a lyophilisation chamber together with an array of vials. During this process vials may move in relation to each other, and the spacer retains the spacer vial so that it is prevented from unintentionally moving away from the vial in which the sensor is positioned.

This sensor positioning device is also optimal for robotic handling as both the data collector and the sensor may be connected to the sensor positioning device prior to the sensor positioning device being mounted on a vial. Robotic handling may give a higher through-put and a larger degree of uniformity in how the sensor positioning device is mounted on the vial. The robot needs only to grab the data collector or the sensor positioning device and move them as one unit onto two vials arranged next to each other or a single vial in case the spacer vial is left out. Robotic handling is particularly advantageous considering that manual handling will often require the operator to wear thick gloves, which hampers precision work.

In embodiments there is a fixed connection between the stopper, the spacer, and the connector. This prevents the stopper from moving in relation to the spacer and the spacer from moving in relation to the connector, which can in turn be connected to the data collector in a fixed connection. In this way the stopper will substantially be prevented from moving in relation to the data collector once the sensor positioning device is mounted thereon, and the sensor can thus be arranged in the vial by holding on to the data collector only. This will facilitate any handling process and is particularly advantageous in connection with robotic handling as the relative positions of the different components of the sensor positioning device will then always be well-defined. The term "fixed" is only to be understood as preventing mutual movement, not necessarily as a permanent connection. It is, however, presently considered advantageous to make at least the connector and the spacer in one, for example by moulding using a polymer or by milling or cutting it from a block of material. The stopper may need to be made from a different material, for example having a higher elasticity, but may still be connected permanently to the spacer, for example by means of a glue or adhesive or by welding or moulding.

Above, with reference to the first and second embodiments of the invention, the silicone, ethylene propylene diene monomer (EDPM), and other synthetic rubbers have been described as advantageous materials for the stopper. In an aspect of the invention, however, the stopper may be configured for resting loosely on the neck of the vial in which case the elasticity of the material is less important, and to facilitate handling of the sensor positioning device, a relatively stiff material may even be preferred. Polyether ether ketone (PEEK) and similar polymers are presently considered promising, particularly for the purpose of making a unitary sensor positioning device, where all elements are made from one piece of material.

The stopper, the spacer, and the connector of the sensor positioning device may be arranged on a straight line defining a length axis of the sensor positioning device, but a different configuration may be expedient to match an array of vial in which it is to be used.

In embodiments a flange is provided at the outer rim of the stopper, said flange extending substantially perpendicular to and away from the exterior surface towards and beyond the interior surface. In a mounted state of the sensor positioning device, the flange will project along an outer surface of the neck of the vial and prevent movement of the stopper relative to the vial, whereas most prior art stoppers rely on the first part of the stopper fitting tightly into the neck of the vial. Tests have shown that it is far easier to fit a stopper with a flange onto a vial, particularly if the first part of the stopper has a smaller diameter than the inner diameter of the neck of the vial and thus does not fit tightly into the vial. The presence of the flange may thus facilitate both manual and robotic handling.

The flange may extend along the entire outer rim of the stopper and be configured for enclosing the neck of the vial, but it is also possible to have two or more smaller flanges arranged at a distance from each other along the outer rim and extending on different sides of the vial.

In an embodiment a tab projecting over an outer perimeter of the neck of the vial in a mounted state as described above projects at an angle to the length axis of the sensor positioning device. This may allow the sensor positioning device to fit into an array of vials where vials in neighbouring rows are off-set in relation to each other. In an embodiment, each spacer member is curved so that the spacer opening is substantially circular, corresponding to the circular shape of the necks of most vials. The outer surfaces of the spacer members are preferably also curved, so that the outer shape of the spacer is substantially circular except for the connections to the connector and the stopper. This contributes to the sensor positioning device being able to fit within an array of vials.

The spacer members may be embodied as walls having major wall surfaces extending perpendicular to the exterior surface of the stopper. This may contribute to guiding a vial into the spacer opening and retaining it during use.

In embodiments, the engagement means of the connector comprises two arms configured to provide a snap-connection to the data collector.

Consequently, simple engagement means are provided, which may provide connection to a wide variety of data collectors. The arms are preferably resilient arms capable of deforming elastically. The data collector may be provided with grooves or recesses configured for engagement with the arms.

Other examples of engagement means are snap fasteners, male-female connectors, and hook-and-loop type fasteners.

The features, embodiments, and advantageous of the invention described in reference to one aspect of the invention also applies to the other aspects of the invention.

It is noted that the interconnection of the stopper, the spacer, and the connector described with reference to the sensor positioning device according to the third aspect of the invention will be advantageous regardless how the stopper is embodied, since it will facilitate handling. Particularly a fixed connection between the stopper, the spacer, and the connector will facilitate handling by robot and thus allow an automation of the handling process, independently of the design of the stopper.

Referring now to the drawings, a sensor unit 1 comprising a sensor positioning device 2 mounted on a vial 3 for use in a lyophilisation process is shown in a cross-sectional FIG. 1 and in a perspective view in FIG. 2. The sensor positioning device comprising a stopper 4 closing the opening in the neck 31 of the vial by being arranged with a first part 41 extending into the vial and a second part 42 extending over the opening of the vial. The second part 42 has an exterior surface 421 forming an exterior surface of the stopper in the mounted state, an interior surface 422 opposite the exterior surface abutting on the neck 31 of the vial, and an outer rim 423 delimiting the stopper in a plane extending in parallel with the exterior surface.

A sensor 5 extends from a distal end 411 of the first part 41 opposite the second part 42, and a cable 51 of the sensor extends through a cable passage 6 in the stopper 4. In this embodiment the sensor 5 is a probe in the form of a thermo couple comprising two dissimilar electrical conductors forming an electrical junction. Such a sensor may be said to constitute a cable in itself, and in the following reference will therefore only be made to the cable 51. In this embodiment a tube 7 extends from the distal end 411 of the stopper 4 towards the bottom 32 of the vial and supports the cable 51 such that the end of the cable 51, and hence the sensing point of the sensor 5, is kept in a well-defined position above the bottom 32 of the vial.

The cable passage 6 consists of a first passage section 61 extending through the first part 41 of the stopper and a second passage section 62 extending through the second part 42 of the stopper. In this embodiment the tube 7 extends into the first passage section 61 and the part of it, which extends away from the stopper, serves as a continuation of the first passage section 61. This provides good support for and protection of the probe, but the tube is not strictly necessary, particularly not if using a different type of sensor.

In this embodiment the stopper 4 and the tube 7 together constitute a sensor positioning device 2 as seen in FIG. 3, but a stopper may also constitute a sensor positioning device on its own.

While the first passage section 61 extends from the distal end 411 towards the exterior surface 421 and follows a linear path, the second passage section 62 is found between the first passage section and the outer rim and allows the cable to follow a non-linear path. In the embodiment shown in FIG. 1 the second passage section 62 comprises three sub-sections 621, 622, 623 each accommodating a section of the cable. A first cable section 511 extends from the first passage section 61 to a first sub-section 621 of the second passage section, a second cable section 512 extends through the first sub-section 621 of the second passage section, and where a third cable section 513 extends from the first sub-section 621 of the second passage section to the outer rim 423. The path followed by the cable through the second passage section thus has the overall shape of the letter Z, and is bent at 90 degree angles where it enters and exits the first sub-section 621 of the second passage section.

In this embodiment the first cable section 511 is accommodated in a second sub-section 622 of the second passage section, which is a groove in the exterior side of the second part of the stopper, as may be seen in FIG. 3, and which extends away from the first passage section towards the outer rim. It is, however, also possible to simply let the first cable section 511 extend over the exterior surface 421 of the stopper without being inserted in a groove or the like. Likewise, the third cable section 513 is here accommodated in a third subsection 623 of the second passage section, which is a groove in the interior side of the second part of the stopper and extends from the first sub-section to the outer rim, but it might instead simply be sandwiched between the interior side of the stopper and neck of the vial in the mounted state.

In the embodiment shown in FIGS. 1-3 the second part of the stopper 42 comprises a tab 424 projecting in a direction parallel to the exterior surface and over the neck 31 of the vial 3 in a mounted state. The tab projects substantially in continuation of the second passage section and the third sub-section 623 continues into the tab. As best seen in FIGS. 1 and 3 the presence of the tab 424 allows that first sub-section 621 of the second passage section to be provided at a bigger distance D from the first passage section 61 than would otherwise have been possible considering that a certain amount of material must be present between the first sub-section and the outer rim 423. This allows the second and third sub-sections 622, 623 to be longer than otherwise possible, which facilitates the mounting of the cable 51 on the stopper 4. Another advantage of the tab 424 is that it may facilitate handling of the sensor unit.

The tab 424 is here provided with two projections 425 on the interior side, one on each side of the third sub-section 623 of the second passage section. In the mounted state these projections extend down along an outer side 33 of the neck 31 of the vial 3 as is seen in FIG. 1, thus potentially contributing to the positioning of the sensor unit in relation to the vial. The two projections further serve as a fixation for the cable 51, which can be clamped between them where it exits the stopper. In this way they contribute to keeping the cable in the third sub-section of the second passage section and they may further provide a strain relief reducing the risk of damages to the cable. The latter particularly applies if the stopper 4 or at least the projections 425 are made from an elastic material, such as rubber.

Turning now to FIGS. 4-6 a second embodiment of the invention is shown. FIGS. 4-6 correspond to FIGS. 1-3 except for showing a different embodiment, and the same reference numbers have been used for features being identical and/or having the same function. In the following, only the features which are different from the embodiment in FIGS. 1-3 will be described.

In FIGS. 4-6 the second sub-section 622 of the cable passage 6 extends all the way from the first passage section 61 to the outer rim 423 of the second part 42 of the stopper 4 and a fourth sub-section 624 of the second passage section extends across the outer rim down to the third sub-section 623. The cable extends the from the first passage section through second sub-section 622, then down through the fourth sub-section 624 across the outer rim, then through the third cable section, and finally through the first sub-section 621 to the exterior side. In this embodiment the cable is bent three times, each over approximately 90 degree, and the path followed by the cable resembles the Greek letter α.

As the cable exits the stopper at the exterior side there is no need for the clamping function of the projections 425 described with reference to FIGS. 1-3 and they have therefore been left out in this embodiment.

As is best seen in FIGS. 3 and 6 the cable passages 6 are in both stoppers 4 independent of the vapour openings 44, which are configured for allowing vapour to escape from the vial during a lyophilisation process, so that escape of vapour is not affected by the presence of the cable.

Figure 8:
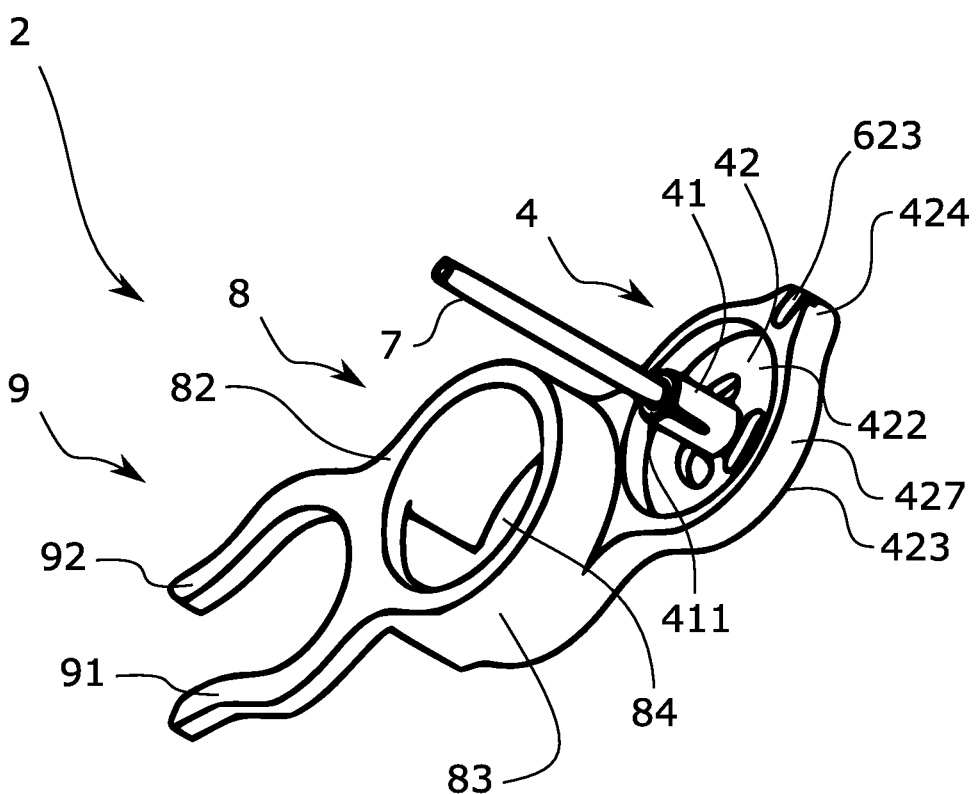
FIG. 8 is a perspective bottom of the sensor positioning device in FIG. 7.

A sensor positioning device 2 according to another embodiment of the invention is shown in a perspective top view in FIG. 7 and in a perspective bottom view in FIG. 8. The same reference numbers have been used for features being identical and/or having the same function as disclosed in relation to FIGS. 1-6.

Figure 10:
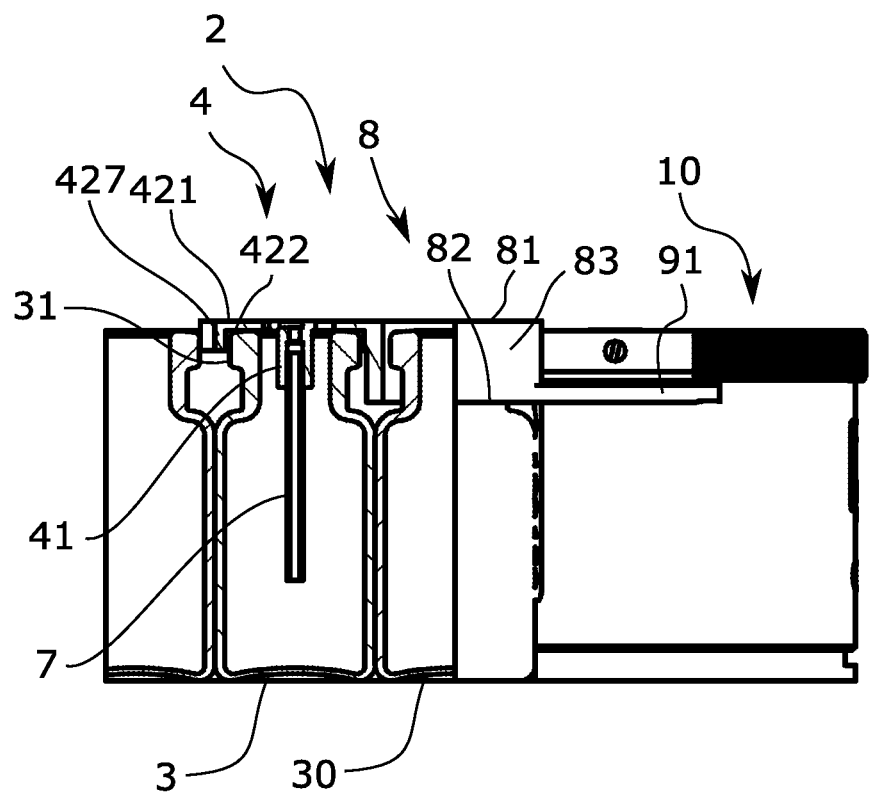
FIG. 10 is a partial cross-sectional view of the sensor positioning device in FIGS. 7 and 8 mounted on a vial and a data collector.

The sensor positioning device 2 comprises a stopper 4 for closing an opening in a neck 31 of a vial 3, said stopper comprising a first part 41 configured to extend into the vial 3 and a second part 42 configured to extend over the opening of the vial 3. The second part 42 has an exterior surface 421 forming an exterior surface 421 of the stopper 4 in the mounted state and an opposite interior surface 422 configured for abutting the neck 31 of the vial 3. The second part 42 further comprising an outer rim 423 delimiting the stopper 4 in a plane extending in parallel with the exterior surface 421. A flange 427 is provided at the outer rim 423 and extends perpendicular to and away from the exterior surface 421 and beyond the interior surface 422. The flange 427 in the mounted state encloses the neck 31 of the vial 3 with little to no clearance as seen in FIG. 10. The flange 427 may facilitate a correct positioning of the sensor positioning device 2 and in the mounted state it may limit movement of the sensor positioning device 2 relative to the vial 3 in a plane extending in parallel with the interior surface 422.

The stopper 4 further comprises vapour openings 44, which are configured for allowing vapour to escape from the vial 3 during a lyophilisation process.

A first groove 622 is formed in the exterior surface 421. The first groove is configured for accommodating a sensor 5, a part of the sensor, or a cable 51 of a sensor as described with reference to the second sub-section 622 in FIGS. 1-6.

Figure 12:
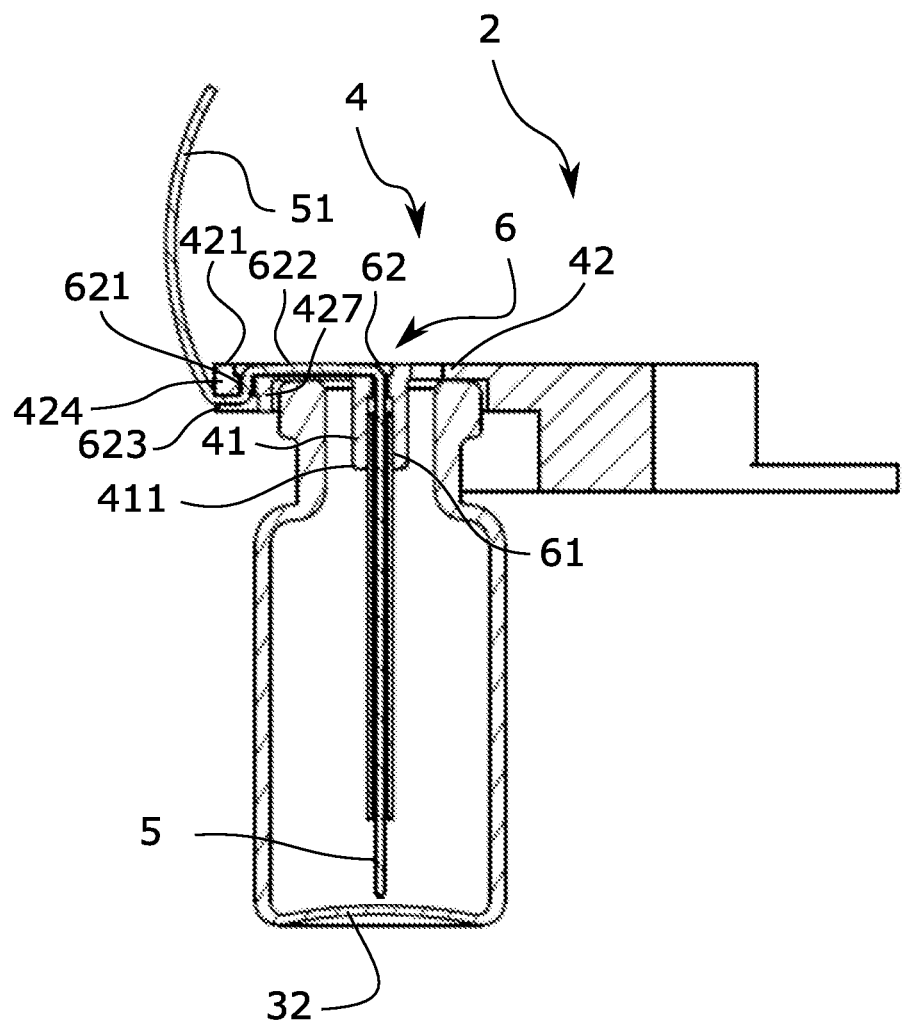
FIG. 12 is cross-sectional view along the line A-A in FIG. 11.

In the embodiment shown in FIGS. 7-8 the second part 42 of the stopper 4 comprises a tab 424 projecting in a direction parallel to the exterior surface 421. The tab 424 projects over a perimeter of the neck 31 of the vial 3 in a mounted state of the sensor positioning device 2. At least part of the first groove 622 extends into a first tab surface of the tab 424. A second tab surface of the tab 424 is provided with a second groove 623 for accommodating a sensor 5 or cable 51 as also described above with reference to the third sub-section 623 in FIGS. 1-6. The second tab surface of the tab is opposite the first tab surface of the tab 424. The first and second grooves are interconnected by a passage 621 corresponding to the first sub-section 621 in FIGS. 1-6 as seen in FIG. 12.

In the shown embodiment a tube 7 extends from a distal end 411 of the first part 41 of the stopper 4. The tube 7 is configured to extend towards the bottom 32 of the vial 3, on which the sensor positioning device 2 is mounted as shown in FIG. 10. The tube 7 is configured for supporting a cable 51 forming at least part of a sensor 5, such that the end of the cable forming a sensing point of the sensor 5 is kept in a well-defined position above a bottom 32 of the vial as shown in FIG. 12. The tube 7 may be provided as an integral part of the first part 41 of the stopper or be connected to the first part 41, e.g. by press fitting the tube 7 into a sleeve formed by the first part 41.

The sensor positioning device 2 further comprises a spacer 8 extending from the stopper 4. The spacer 8 comprises two spacer members 83, each being curved so that a spacer opening 84 with a circular shape is provided between them. The spacer members 83 are here embodied as spacer walls having major wall surfaces extending perpendicular to the exterior surface 421 of the stopper.

In the shown embodiment a first surface 81 of the spacer extends in continuation of the exterior surface 421 of the second part 42 of the stopper. Alternatively, the first surface 81 may extend from the stopper 4 in a plane parallel to a plane defined by the exterior surface 421. Opposite the first surface 81 is a second surface 82.

Figure 9:
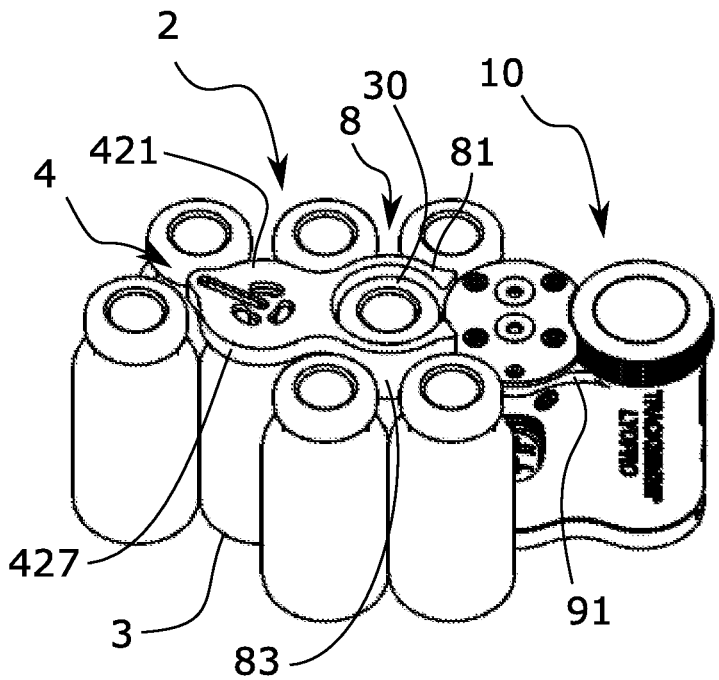
FIG. 9 is a perspective view of the sensor positioning device in FIGS. 7 and 8 mounted on a vial and a data collector and arranged in an array of vials.

The spacer opening 84 is configured for receiving at least part of a spacer vial 30 within the spacer opening 84 as shown in FIGS. 9 and 10. The spacer vial is a vial placed in the proximity of the vial 3 on which the stopper 4 is to be mounted, e.g. next to the vial 3 on which the stopper 4 is to be mounted. In the mounted condition of the sensor positioning device 2, the spacer wall 83 limits movement of the spacer vial 30 received within the spacer opening 84 relative to the sensor positioning device 2.

The sensor positioning device 2 further comprises a connector 9. The connector 9 is configured for connecting the sensor positioning device 2 to a data collector 10 as shown in FIGS. 9 and 10. The connector 9 has two arms 91, 92. The arms 91, 92 are slightly bent towards each so that a semi-circular receiving space 93 is formed between them. The receiving space 93 is configured to receive at least part of the data collector 10, so the data collector 10 is prevented from moving relative to the sensor positioning device 2, at least within one plane. The arms 91, 92 extends continuously from the second surface 82 of the spacer. In the shown embodiment at least part of the arms 91, 92 lies in the same plane as the second surface 82. The arms 91, 92 are resilient arms configured to provide a snap-connection between the data collector 10 and the sensor positioning device 2.

The connector 9, the spacer 8 and the stopper 4 are in the shown embodiment integrally formed, thus preventing relative movement between the connector 9, the spacer 8 and the stopper 4. The integral connection is provided by making the connector 9, the spacer 8 and the stopper 4 from the same material as one unitary item, for example by milling, cutting or moulding. Alternatively, the connector 9, the spacer 8 and the stopper 4 may be connected to one another for example by gluing or welding.

In the embodiment shown, the stopper 4, the spacer 8, and the connector 9 of the sensor positioning device 2 are arranged on a straight line defining a length axis of the sensor positioning device, but a different configuration is possible if expedient to match the position of the vial in the array, where the sensor positioning device is to be used.

Turning now to FIGS. 9 and 10 showing a perspective view of the sensor positioning device 2 in FIGS. 7 and 8 mounted on a vial 3 and a data collector 10, here in the form of a data logger.

Here the first part 41 of the stopper 4 has been introduced into the vial 3 and the tube 7 extending from the first part 41 guides the sensor 5 to a position close to the bottom of the vial 3.

The second part 42 abuts a neck 31 of the vial 3 and covers the opening therein. The exterior surface 421 of the second part 42 faces away from the vial 3, the interior surface 422 abuts the neck 31 of the vial 3, and the flange 427 extends downwards along outer sides of the neck 31 of the vial 3, enclosing the neck 31. The flange 427 limits movement of the vial 3 relative to the sensor positioning device 2.

A spacer vial 30 is received within the spacer opening 84 and the spacer wall 83 encloses the neck of the spacer vial 30. The spacer wall 83 ensures that the spacer vial 30 does not move excessively relative to the sensor positioning device 2. As is noticeable on FIG. 10, a small clearance is present between the part of the spacer vial 30 received within the spacer opening 84 and the spacer wall 83. Furthermore, the second surface 82 of the spacer 8 does not contact the spacer vial 30, hence no contact is present between the spacer 8 and the spacer vial 30. This allows for the sensor positioning device 2 to be lowered down over the spacer vial 30 or for the vial to be inserted into the spacer opening 84 with virtually no frictional resistance, thus facilitating handling. This applies regardless of the embodiment of the stopper and the connector. In other embodiments, the spacer 8 may be configured to abut the spacer vial 30, e.g. the second surface 82 being configured to abut the spacer vial 30, thereby potentially indicating when the spacer vial and the sensor positioning device are correctly positioned in relation to each other.

Extending from the spacer 8 is the arms 91, 92 of the connector 9, only one being visible on FIGS. 9 and 10. The arms 91, 92 are engaged with a data collector 10 in a snap connection provided by resiliency in the arms 91, 92. The data collector 10 is thereby distanced from the vial 3 on which measurements are collected.

Figure 11:
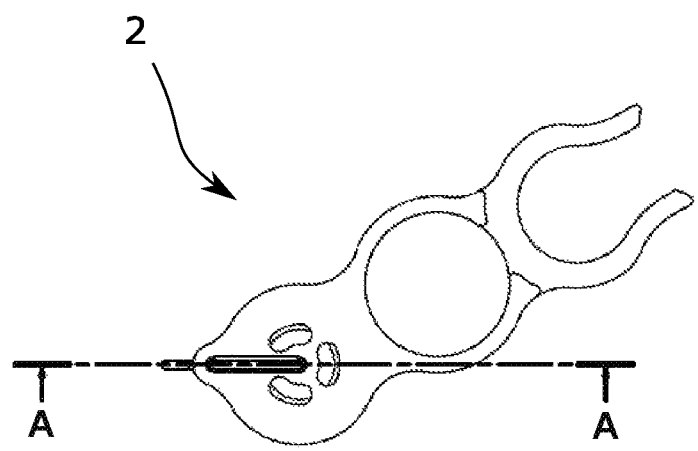
FIG. 11 is a perspective bottom of the sensor positioning device in FIGS. 7 and 8.

Referring now to FIGS. 11 and 12, where FIG. 12 shows a cross-sectional view along the line A-A in FIG. 11.

As described with reference to FIGS. 1-3, the cable passage 6 of this embodiment too consists of a first passage section 61 extending through the first part 41 of the stopper 4 and a second passage section 62 extending through the second part 42 of the stopper 4. The first passage section 61 extends from the distal end 411 towards the exterior surface 421 and follows a linear path. The second passage section 62 is found in the second part 42 of the stopper 4 and allows the cable 51 to follow a non-linear path. In the embodiment shown in FIG. 12 the second passage section 62 comprises a first subsection 621, a second sub-section 622, and a third sub-section 623 each configured to accommodate a section of the cable 51. The only differences in relation to the embodiment in FIGS. 1-3 is that the second subsection 622, also called the first groove above, extends further, into the tab 424, such that the first sub-section 621 and the third sub-section 623, also called the second groove above, are both located in the tab 424.

While, in the embodiment in FIGS. 1-6, the third cable section 513 is potentially in contact with the vial and can be clamped between the vial 3 and the stopper 4 due to friction between the first part 41 of the stopper and the neck of the vial, the stopper 4 in FIGS. 7-12 will be resting loosely on top of the vial. This means that the cable 51 of the sensor 5 cannot be clamped between the vial 3 and the stopper 4 and it is therefore retained only by the engagement with the stopper.

In the embodiment shown, the tab 424 projects at an angle to length axis of the sensor positioning device, i.e. the straight line on which the stopper 4, the spacer 8, and the connector 9 are arranged. This allows the sensor positioning device to fit into an array of vials as shown in FIG. 9, where vials in neighbouring rows are off-set in relation to each other. Had the tab projected along length axis and had the same size, it would have collided with the neighbouring vial.

The advantages achieved by the interconnection of the stopper 4, the spacer 8, and the connector 9 will be present even if the stopper is embodied differently, both with respect to the overall shape of the stopper 4 and with respect to the shape of the cable passage 6.

Further embodiments and combinations of features are possible within the scope of the claims.

The invention claimed is:

1. A sensor positioning device for use on a vial in a lyophilisation process comprising a stopper configured for closing an opening in a neck of the vial when mounted thereon, said stopper comprising:
    a first part configured for extending into the vial and a second part configured for extending over the opening of the vial, said first part extending away from the second part and having a distal end opposite the second part, and said second part having an exterior surface forming an exterior surface of the stopper in a mounted state, an interior surface opposite the exterior surface configured for abutting on the neck of the vial, and an outer rim delimiting the stopper in a plane extending in parallel with the exterior surface,
    a cable passage having a first passage section extending from the distal end towards the exterior surface and allowing a cable of a sensor to pass through the first part of the stopper and a second passage section between the first passage section and the outer rim, and
    at least one vapour opening allowing vapour to escape from the vial,
    where the second passage section or a first sub-section thereof extends away from the exterior surface towards the interior surface and is located at a distance from the first passage section in a direction parallel to the exterior surface.

2. The sensor positioning device according to claim 1, wherein the second passage section or the first sub-section thereof extends in a direction, which is perpendicular to the exterior surface.

3. The sensor positioning device according to claim 1, wherein the second passage section or the first sub-section thereof extends from an opening in the exterior surface to an opening in the interior surface.

4. The sensor positioning device according to claim 1, wherein a second sub-section of the second passage section extends away from the first passage section towards the outer rim.

5. The sensor positioning device according to claim 1, wherein a third sub-section of the second passage section extends from the first sub-section to the outer rim.

6. The sensor positioning device according to claim 4, wherein a second sub-section of the second passage section is a groove in the exterior side of the second part of the stopper and/or wherein a third sub-section of the second passage section is a groove in the interior side of the second part of the stopper.

7. The sensor positioning device according to claim 1, wherein the second part of the stopper comprises a tab configured for projecting over the neck of the vial in a mounted state, said tab projecting in a direction parallel to the exterior surface of the stopper and substantially in continuation of the second passage section.

8. The sensor positioning device according to claim 7, where tab is provided with at least one projection on the interior side, said projection being configured for extending down along an outer side of the neck of the vial in the mounted state of the sensor positioning device.

9. The sensor positioning device according to claim 1, further comprising a spacer and a connector, wherein the spacer is positioned between the stopper and the connector, wherein the spacer comprises two spacer members extending from the stopper substantially in parallel to the exterior surface, said spacer members defining a spacer opening for receiving a spacer vial between them, and wherein the connector comprises engagement means for attaching the sensor positioning device to a data collector, and wherein the connector extends from the spacer.

10. The sensor unit comprising a sensor positioning device according to claim 1, a sensor extending from the first part of the stopper, and a cable of the sensor, where a first cable section extends from the first passage section in a direction towards the outer rim and where a second cable section extends through the second passage section or the first sub-section thereof, at least one bent being present on the cable between said first and second cable sections, and in where at least one further cable section, which extends along the second part of the stopper, is separated from the first and second cable sections by at least one bent.

11. The sensor unit according to claim 10, where the first cable section extends from the first passage section to a first sub-section of the second passage section, where the second cable section extends through the first sub-section of the second passage section, and where a third cable section extends from the first sub-section of the second passage section to the outer rim, said first, second, and third cable section being arranged in continuation of each other when seen along the length of the cable.

12. The sensor unit according to claim 10, where the first cable section extends from the first passage section to the outer rim, where a fourth cable section extends from the first cable section across the outer rim to a third cable section, where the third cable section extends from the fourth cable section at the outer rim to the first sub-section of the second passage section, and where the second cable section extends from the third cable section through the first sub-section of the second passage section.

13. The sensor unit according to claim 11, where the first cable section extends along the exterior surface of the second part of the stopper and where the third cable section extends along the interior surface of the second part of the stopper.

14. A method of mounting a sensor including a cable in a stopper for a vial thereby creating a sensor unit for use on a vial in a lyophilisation process, where said stopper is configured for closing an opening in a neck of the vial when mounted thereon, said stopper comprising:
  a first part configured for extending into the vial and a second part configured for extending over the opening of the vial, said first part extending away from the second part and having a distal end opposite the second part, and said second part having an exterior surface forming an exterior surface of the stopper in a mounted state, an interior surface opposite the exterior surface configured for abutting on the neck of the vial, and an outer rim delimiting the stopper in a plane extending in parallel with the exterior surface,
  a cable passage having a first passage section extending from the distal end towards the exterior surface and a second passage section between the first passage section and the outer rim, and
  at least one vapour opening allowing vapour to escape from the vial, said method comprising the following steps:
  A) arranging the sensor to projects from the distal end of the first part of the stopper, and B) passing the cable of the sensor through the cable passage, where step B) comprises the following sub-steps:
  arranging a first cable section to extend from the first passage section in a direction towards the outer rim,
  arranging a second cable section so that it extends through the second passage section or a first sub-section thereof, said second passage section or first sub-section thereof extending away from the exterior surface towards the interior surface and being located at a distance from the first passage section in a direction parallel to the exterior surface,
  creating at least one bent on the cable between said first and second cable sections,
  arranging at least one further cable section to extend along the second part of the stopper, and
  creating at least one further bent on the cable between the at least one further cable section and the first and/or second cable sections.

15. The sensor positioning device according to claim 5, wherein a second sub-section of the second passage section is a groove in the exterior side of the second part of the stopper and/or wherein a third sub-section of the second passage section is a groove in the interior side of the second part of the stopper.

16. The sensor positioning device according to claim 1, wherein:
  a third sub-section of the second passage section extends from the first sub-section to the outer rim; and
  the second part of the stopper comprises a tab configured for projecting over the neck of the vial in a mounted state, said tab projecting in a direction parallel to the exterior surface of the stopper and substantially in continuation of the second passage section.

17. The sensor positioning device according to claim 16, where the third sub-section of the second passage section extends into the tab.

18. The sensor unit comprising a sensor positioning device according to claim 9, a sensor extending from the first part of the stopper, and a cable of the sensor, where a first cable section extends from the first passage section in a direction towards the outer rim and where a second cable section extends through the second passage section or the first sub-section thereof, at least one bent being present on the cable between said first and second cable sections, and in where at least one further cable section, which extends along the second part of the stopper, is separated from the first and second cable sections by at least one bent.

19. The sensor unit according to claim 12, where the first cable section extends along the exterior surface of the second part of the stopper and where the third cable section extends along the interior surface of the second part of the stopper.

20. The sensor positioning device according to claim 17, where tab is provided with at least one projection on the interior side, said projection being configured for extending down along an outer side of the neck of the vial in the mounted state of the sensor positioning device.

* * * * *